United States Patent
Arye et al.

(10) Patent No.: US 8,194,669 B1
(45) Date of Patent: Jun. 5, 2012

(54) METHOD AND SYSTEM FOR IDENTIFYING MEDIA TYPE TRANSMITTED OVER AN ATM NETWORK

(75) Inventors: Ram Arye, Rishon-le-Zion (IL); Emanuel Fleishman, Tel Aviv (IL)

(73) Assignee: Celtro Ltd, Petach Tikva (IL)

( * ) Notice: Subject to any disclaimer, the term of this patent is extended or adjusted under 35 U.S.C. 154(b) by 636 days.

(21) Appl. No.: 12/428,929

(22) Filed: Apr. 23, 2009

Related U.S. Application Data

(60) Provisional application No. 61/047,725, filed on Apr. 24, 2008.

(51) Int. Cl.
*H04L 12/28* (2006.01)
(52) U.S. Cl. ........................................ 370/392
(58) Field of Classification Search ........................ None
See application file for complete search history.

(56) References Cited

U.S. PATENT DOCUMENTS

| | | | |
|---|---|---|---|
| 6,594,267 B1 * | 7/2003 | Dempo | 370/395.64 |
| 6,865,150 B1 * | 3/2005 | Perkins et al. | 370/230 |
| 6,944,138 B1 * | 9/2005 | Song | 370/310.1 |
| 7,054,320 B1 * | 5/2006 | Lee et al. | 370/395.6 |
| 7,346,060 B1 * | 3/2008 | Ellis | 370/395.3 |
| 2001/0043605 A1 * | 11/2001 | Arakawa | 370/395.1 |
| 2002/0126677 A1 * | 9/2002 | Hathaway et al. | 370/395.64 |
| 2004/0085956 A1 * | 5/2004 | Moriarty et al. | 370/389 |
| 2004/0213204 A1 * | 10/2004 | Yang | 370/352 |

* cited by examiner

*Primary Examiner* — Otis L Thompson, Jr.
(74) *Attorney, Agent, or Firm* — Smith Risley Tempel Santos LLC; Gregory Scott Smith

(57) ABSTRACT

A system and method suitable for identifying the type of communication that is transferred between two intermediate nodes over a communication link that has a plurality of different channels or sub-channels each of which carry user's data. With accurate identification of the communication types, subsequent bandwidth management decisions can be made such that a telecommunications system can have increased bandwidth utilization without jeopardizing user contracted QoS levels.

10 Claims, 6 Drawing Sheets

METHOD AND SYSTEM FOR IDENTIFYING MEDIA TYPE TRANSMITTED OVER AN ATM NETWORK

CROSS-REFERENCE TO RELATED APPLICATIONS

This application is being filed under 35 USC 111 and 37 CFR 1.53(b) and claims the benefit of the filing date of the United States Provisional Application for patent that was filed on Apr. 24, 2008 and assigned Ser. No. 61/047,725.

BACKGROUND OF THE INVENTION

The rapid evolution of communication networks, including wireless communication networks for mobile communications such as Global System for Mobile communications (GSM) networks, 3G networks, etc., has substantially increased the load on existing network infrastructures of cellular operators. Along with the evolution of communication technologies, a common communication session has also evolved in complexity and is often comprised of several data (media) types such as voice, video, computer data, signaling, etc. Additionally, a single connection between two points representing a source and a destination of a communication session may be conducted over a combination of several network types including PSTN, TDMA, FDMA, ATM, IP, CDMA, cellular networks (1G or 2G or 3G or, eventually, 4G), microwave links, etc. Moreover, a certain class of data being transferred within a given communication session may further be compressed and/or encrypted.

The topologies associated with today's mobile communications networks vary. A common network topology having a central location and a plurality of users can be depicted as having the shape of a tree. In such a tree-like architecture, a central point may be connected to one or more intermediate nodes with each intermediate node having connections to one or more other intermediate nodes and/or to one or more end-user devices (terminals). For example, in a 3G network a central node may be a Radio Network Controller (RNC) and an intermediate node may be a node base station (Nb). Another common mobile telecommunications network topology can be illustrated by the shape of a ring in which a central point (RNC for example) and an intermediate node (Nb, for example) are connected to the ring. Regardless of the specific topology of a mobile telecommunications network, an RNC is commonly used in the role of a central node whereas an Nb most commonly performs as an intermediate node. Accordingly, it should be understood that the description, drawings and claims of the present application may use the term "RNC" as a representative term for a central node and the term "Nb" as a representative term for an intermediate node. Further, exemplary mobile terminals (MT) referenced in this application can be a cellular phone, a PDA with cellular capabilities, or any other computerized device capable of generating and/or receiving any combination of audio, video, or data via a communication network such as, but not limited to, a cellular network.

In a mobile telecommunications network, an RNC is commonly used as an aggregation point for different data types being transferred to and from a plurality of MTs. An RNC is operable to receive circuit switched telephony traffic as well as packet switched traffic traveling to and from the Internet, for example. Further, it is common for a communication line between a central point and an intermediate node to carry a plurality of communication sessions, each having different media types, between one or more other intermediate nodes and/or one or more terminals. Different types of networks and protocols can be employed over a typical communication line. A communication line can be based on Time Division Multiplexing Access (TDMA), Asynchronous Transfer Mode (ATM), Ethernet, etc. and each communication line may be divided into a plurality of channels with each channel being dedicated to a single connection between two terminals.

With some communication protocols, a given channel may be divided into two or more sub-channels. Each sub-channel may be subsequently dedicated to a single connection (session). Usually, the data transportation over a connection between an intermediate node and a central node is organized in layers such as a user layer, an adaptation layer and a data link layer. An exemplary user's layer may comprise the application layer, presentation layer, session transport layer and the network layer of the Open Systems Interconnection Model (OSI). An exemplary adaptation layer may be of an ATM Adaptation Layer type (AAL-2) while an exemplary data link layer may be ATM. In each layer the data can be organized in data units such as frames, packets, chunks, sub-frames, etc. and it should be noted that the terms "frames," "packets," "chunks," and "sub-frames" may be used interchangeably herein. Further, each frame may have a header and a payload. For example, data of a 3 G communication over an ATM bearer may be encrypted, divided into small ATM cells, and aggregated with a portion of data that is associated with other communication sessions between other users.

Clearly, the overall network topology for modern mobile telecommunications networks can be very complex. The result of such complexity is that a single communication connection between two intermediate nodes over a fixed network, or backbone, of a cellular operator may be comprised of a combination of network standards, communication protocols, compression standards, and encryption methods for a plurality of users.

In a 3G network, a user layer is carried above an ATM Adaptation Layer AAL-2. Therefore, a payload of an ATM cell can be comprised of data from two or more sessions, each session having been executed between different users. In addition, a chain of consecutive cells can carry data of different types from sessions between different users. A session is defined as a communication between a source and a destination (users) and is executed according to a combination of one or more protocols. Furthermore, in a 3G network, usually the user's layer is encrypted. It should be understood that the term "user's frame/packet" is used interchangeably in the herein as the term can refer to a data chunk that was created by an audio or video encoder or any other application used by the user.

A common way to satisfy the needs of users without overloading the capacity of a service provider infrastructure is by offering different types of services with varying levels of associated quality (QoS). For example, a real time communication telephone session over a cellular network may have the highest level of QoS whereas a data communication based on Internet Protocol (IP) may correspond to a lesser quality of service defined as "best effort."

Another strategy to meet the needs of users without overloading the capacity of a network is to actively manage bandwidth. Decisions along such lines may incorporate policies of dropping certain types of communication, increasing latency of other types of communication, etc. Bandwidth management decisions are often based on the traffic contracts of network users. If a user is exceeding its traffic contract, for example, the network may either drop or delay a portion of the user's traffic. Commonly, bandwidth management decisions are made in a central network point, such as an RNC, and based on the load over a certain connection path being used by a given user.

Segments of fixed cellular networks serve as aggregation points, or points of concentration (POC), for loads that originate from various intermediate nodes with designations to be transferred on a common communication link. Therefore, there is a need for adapting bandwidth management decisions at the egress of the node closer to the communication link to consider the real load over the physical connection. If, however, the bandwidth management decision must be made at a point between the RNC and the MT, for example at the access to an ATM bearer identification of the communication type over a certain channel will be difficult because an entire user's frame or packet with its header can be encrypted and be divided into small ATM cells. More specifically, an ATM cell can be divided into small portions with each portion being associated with a different session. Furthermore, there is no control or signaling information associated with an ATM cell such that the session types carried by an ATM cell can be identified.

Taking the aforementioned into consideration, therefore, there is a need for a system and method suitable for identifying the type of communication that is transferred between two intermediate nodes over a communication link that has a plurality of different channels or sub-channels each of which carry unique, encrypted data. With accurate identification of the communication types, subsequent bandwidth management decisions can be made such that a mobile telecommunications system can have increased bandwidth utilization without jeopardizing user contracted QoS levels.

BRIEF SUMMARY OF THE INVENTION

Exemplary embodiments of the present invention provide a system and method for identifying the various types of communication sessions traveling over a network communication link. The communication link may connect a central node in the network such as an RNC to an intermediate node such as an Nb. Alternatively, the communications link may connect two intermediate network nodes. Regardless of the nature of the specific communications link, a network user's frame/packet of a communication session is carried as a payload of data units that are used over the communication link. Though not limited as such, the data units, for example, can be ATM cells. In an alternate embodiment of the present invention, a network user's frames/packets of a communication session can be carried as payload of IP tunneling packets that are used over the communication link. Additionally, a payload may be encrypted as well as include data from more than one session.

An exemplary embodiment of the present invention can reside at the point of ingress into a network communication link (a bearer), between an RNC and a bearer for example. Another embodiment of the present invention can reside between a unit of compression equipment and an RNC or Nb. Along the description, drawings and claims of this application the terms "communication line or link" and "bearer" are used interchangeably. Henceforth, the description, drawings and claims of the present invention may use the term 'bearer' as a representative term for any of the above group.

An exemplary embodiment of the present invention is adapted to identify the session type at the ingress point of an ATM bearer that resides on a cellular operator's fixed network. In doing so, the embodiment may be capable of intercepting the traffic of ATM cells directed toward the bearer, analyzing the AAL-2 header of the ATM cells, and maintaining an active sessions data structure (ASDS) wherein each one of the entries can be associated with an active session that is traveling over the connection.

An active session can be represented by a combination of VP (Virtual Path), VC (Virtual Channel), and CID (Channel Identification). Each entry in ASDS can include a plurality of fields and each field can be associated with a discriminating feature. For example, a field may be associated with the length (size) of data chunks that carry the session such that the field can be a counter that counts the number of bytes of the session. The size can be the number of bytes of payload originating from ATM cells that are associated with the combination of VP, VC and CID from the first appearance of the combination until a second appearance of the same combination is identified. In the example, one of the fields can be associated with the session type and updated after the session type is defined. If a session is not active for more than a configurable value of time, then the session is deleted from the ASDS.

There are exemplary embodiments of the present invention in which a network user's frames/packets of a communication session is carried as payload of IP tunneling packets that are used over the communication link. In such embodiments, the source and/or the destination IP address and port of the tunneling packet can be used for identifying a user's communication session instead of the VP, VC and CID that are used in ATM networks.

A combination of VP and VC is associated with a quality of service (QoS) level, therefore the combination can be an accurate indication of media type. The CID, on the other hand, is associated with a current active user. Further, the traffic over a combination of VP and VC is sequential, meaning that an original received data chunk of a media type having a certain a certain combination of VPa and VCa from a certain user (CIDa) will be embedded within one or more ATM cells and transmitted without interruption by a data chunk of another user (CIDc, for example) having the same VPa/VCa combination. The transmission can be interrupted, however, by a data chunk having a higher QoS (VPb/VCb) of the same user (same CIDa) or by another user (CIDb) that will be transmitted over another ATM cell that associates with the higher QoS combination (VPb/VCb).

An ATM cell that belongs to a certain combination of VP/VC can carry data that is associated with two different users. Such a cell may comprise two Common Part Sub-layer (CPS) units. Each CPS starts with a CPS header that has a CID associated with one of the two network users. A frame of an encoded audio or video that belongs to a circuit switched session, or a packet that belongs to a packet switched session, can be carried by one or more ATM cells. Each frame or packet will start with a CPS header having the specific CID that represents a user who is associated with the session. The frame or the packet will terminate with either padding bytes or another CPS header of another CID. The ATM protocol defines the location of the beginning of the second CPS, with the offset from the ATM header. It should be noted that ATM protocols are well known to those skilled in the art and, therefore, the specific ATM protocol used by an embodiment of the present invention, while possibly novel in and of itself, should not be considered as a limiting factor of the present scope. Another embodiment of the present invention, offered herein as a non-limiting example of an alternative methodology used by some embodiments, utilizes the different features of network data traffic in order to identify communication session type. As an example of a network data traffic feature than can be used to identify communication session type is the length (size) of session associated data chunks. The size of a data chunk can be expressed by the number of bytes that are included in the chunk. A chunk can be a frame of encoded voice created by a codec of a cellular phone, for example, traveling over a circuit switched connection. Another non-limiting example of chunk type may be an IP packet, which is carried over a packet switched connection. Observations show that frames of encoded voice carried over a circuit switched connection are small, potentially having less than 48 bytes, for example. By contrast, a computer data chunk over a packet switched connection is large, usually above hundred of bytes and commonly comprising up to 1500 bytes Offered herein for exemplary purposes, packets of voice over IP (VoIP) sessions can have about 120 bytes and data packets can have up to 1500 bytes.

Other discriminating feature of network data traffic that can be used by some embodiments of the present invention in order to identify a communication session is the bandwidth associated with the session. The bandwidth can be calculated as the total number of bytes that were transmitted over a certain period of time ranging from tenths to hundredths of milliseconds. Those skilled in the art will know that bandwidth used by a common voice session over a circuit switched connection can be, for example, 30 Kb/sec or less. Further, video conferencing over circuit switched can be 64 Kb/s, for example, while bandwidth consumption of a data session over a packet switched connection (an IP connection) is higher and can be in the range of 128 to 384 Kb/sec.

The time behavior of bandwidth consumption can be used as another discriminating feature useful for identification of session type. As an example, bandwidth consumption of a voice session can be high when a user is talking, up to 30 Kb/sec for a period of few seconds to few minutes. Alternatively, when a party to a voice session is listening to the other party the bandwidth drops to around 2 KB/sec. Such a pattern of time behavior can thus be used by some embodiments of the present invention to accurately identify session types. As another example of time behavior unique to a given session type, browsing sessions feature bandwidth consumption can be high during downloading of a web page whereas the bandwidth utilization after the download activity can drop to zero, or almost zero, when the user is reading the web page.

Yet another exemplary discriminating feature of network data traffic that may be used by some embodiments of the present invention for the identification of a session type is the time window between consecutive user's frames/packets. A user's frames for a voice session over a circuit switched connection, for example, may appear at a constant rate and, therefore, such a pattern may be indicative of an active voice session over a monitored link. Based on the collected information stored at the data structure (ASDS), an exemplary embodiment can determine the type of the session that is using a specific combination of VP, VC and CID. Information on the session type can be transferred to a bandwidth management unit wherein the bandwidth management unit may consider the session type in view of a relevant service contract, a current load over the bearer, and policy of the operator in order to make bandwidth management decisions. Exemplary bandwidth management decisions based on the aforementioned data may include transferring as fast as possible, aggregating (delay), dropping, compressing, changing routing, associating session type indication, or the like.

The foregoing summary is not intended to summarize each potential embodiment or every aspect of the present disclosure, and other features and advantages of the present disclosure will become apparent upon reading the following detailed description of the embodiments with the accompanying drawings and appended claims.

Furthermore, although specific exemplary embodiments are described in detail to illustrate the inventive concepts to a person skilled in the art, such embodiments can be modified to various modifications and alternative forms. Accordingly, the figures and written description are not intended to limit the scope of the inventive concepts in any manner.

BRIEF DESCRIPTION OF THE SEVERAL VIEWS OF THE DRAWING

Exemplary embodiments of the present invention will be understood and appreciated more fully from the following detailed description, taken in conjunction with the drawings in which.

DETAILED DESCRIPTION OF THE INVENTION

The present invention, as well as features and aspects thereof, generally relates to communication networks, and more particularly to communication networks that carry data and media using different communication protocols between a plurality of users over one or more communication lines between two intermediate nodes over an ATM network.

Turning now to the figures in which like numerals represent like elements throughout the several views, exemplary embodiments of the present invention are described. For convenience, only some elements of the same group may be labeled with numerals. The drawings illustrate exemplary embodiments such that a person skilled in the art may understand the invention and are not intended for production purposes. Accordingly, features shown in the figures were chosen only for convenience and clarity of presentation.

Figure 1:
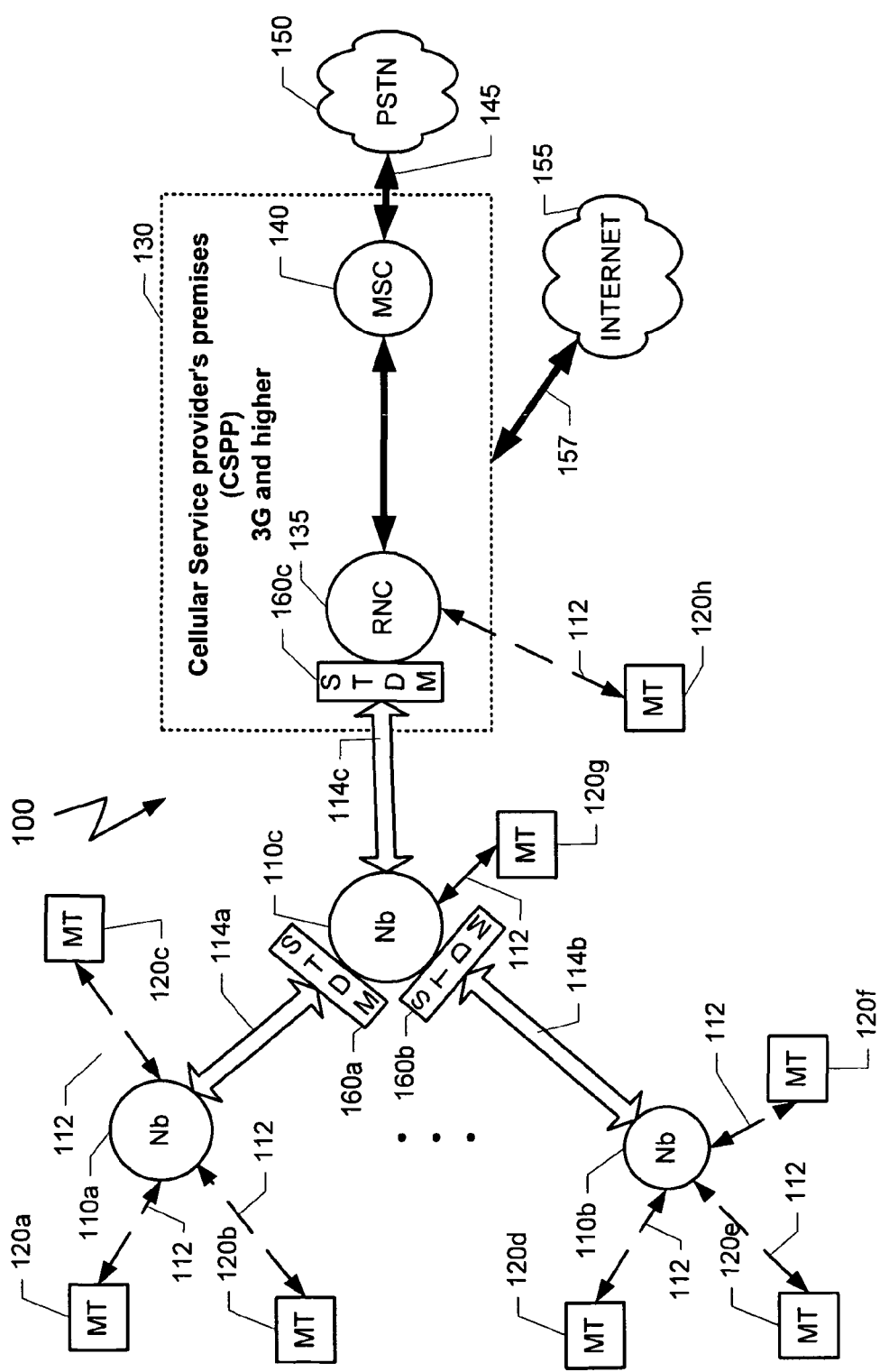
FIG. 1 is a simplified block diagram illustration of an exemplary portion of a communication network in which an exemplary embodiment of the present invention is used.

FIG. 1 illustrates a block diagram of a portion of an exemplary cellular network 100. The cellular network 100 may comprise a plurality of intermediate nodes (Nbs) 110a-c and a Cellular Service Provider Premises (CSPP) 130. A common Nb 110a-c wirelessly 112 connects mobile terminals (MT) 120a-g serviced by the network 100. The Nbs 110a-c are connected to a central node embodied by a regional radio network controller (RNC) 135, which is located at the CSPP 130, through the combination of a plurality of links 114a-c. Links 114a-c may comprise cable wires (e.g. the E1 link), fiber optics, or other communication links, such as wireless omni-directional links, microwave links, etc. and, because the various modes of linking are known to those skilled in the art, the particular mode of linking should not be limiting to the scope of the invention Likewise, the transportation over links 114a-c may be based on different types of communication protocols, including but not limited to ISDN, ATM, Internet Protocol (IP), etc., and, as such, the specific communication protocol, or combination of protocols, used by a network embodying the present invention should not be construed as a limiting factor for the scope of the invention. Exemplary MTs 120a-h can include a cellular phone, a PDA with cellular capabilities, or any other computerized device that can generate and/or receive audio, video, data or any combination of those via a cellular network.

At the CSPP 130, one or more RNCs 135 may be connected to a mobile switching center (MSC) 140. Among other tasks, the MSC 140 may serve as an interface between the cellular network 100 and one or more Public Switched Telephone Networks (PSTN) 150. Further, the MSC 140 may comprise one or more codec devices at a Transcoder Rate Adapter Unit (TRAU), for example. The codec may be used to compress (encode) audio coming from a regular telephone via the PSTN 150 connection 145 and targeted to one of the MTs 120a-h that are connected over network 100. Optionally, the codec at the MSC 140 may be used as an initiator of a compressed audio or as a receiving entity (destination) for a compressed audio depending on the direction of the transportation. In some embodiments, an RNC 135 may have some of the functionality of the MSC 140. In addition, the CSPP 130 may be connected to the Internet 155 via connection 157. At the CSPP 130, the IP transportation toward or from an MT 120a-h may be processed by different modules, such as but not limited to, SGSN, GGSN, etc. which are not shown in the drawings.

Each link 114a-c may comprise one or more tunnels, which are formed of a plurality of channels. In 3G networks, for example, the communication between the RNC 135 and the different Nbs 110a-c, over the communication links 114a-c, may be encrypted. A common RNC 135 may also communicate directly with one or more MTs 120a-h that are located in an area served by RNC 135.

When an MT 120a-h participates in a communication session, the RNC 135 may allocate a connection from RNC 135 to the Nb 110a-c servicing the MT 120. The allocated connection is formed as a channel or sub-channel which is dedicated to the certain MT 120, meaning used only for transferring information to and from the MT 120 to which the connection was allocated. The allocation remains in effect until the session is terminated. A non-exhaustive list of communication session types includes a phone call, a short messages service (SMS) session, a data session based over IP (Internet Protocol), a video session, etc. Each type of session can have its own dedicated channel or sub channel. During a phone call session or video session, for example, the MT 120 converts input audio/video signals into digital signals. The digital signals are compressed (encoded) by the MT 120, and the compressed signals are transmitted to the servicing Nb. Generally, the compressed digital signals are organized in frames with each frame comprising a header and a compressed payload. In a 3G network, a common user layer traffic is encrypted and can include compressed media as well as the data traffic.

The servicing Nbs 110a-c transfer the compressed and/or encrypted signals as they are, without decompressing and/or decrypting them, to the RNC 135, over bearers 114a-c and from there to MSC 140. The IP transportation can be transferred from RNC 135 via one or more gateways and/or routers (not shown in the drawings) that are located at CSPP 130 toward the internet 155. Downstream transportation (audio and/or video and/or computer data) from CSPP 130 to a MT 120 may be received via PSTN 150 or Internet 155 or from any other MT 120. The received transportation is processed by MSC 140 or IP gateway (not shown) and RNC 135 and may be sent toward the targeted MT 120 via one or more bearers 114a-c and one or more Nbs 110a-c.

A common method to control the load over an exemplary network is the aggregation of sessions. Generally, an aggregation decision is based on the level of service to which a user is entitled for a specific type of session. The level of service depends on the type of the communication session. Embodiments incorporating an aggregation aspect include a session type detector module (STDM) 160a-c inserted in a junction between an Nb 110a-c or RNC 135 and a bearer 114. For example, STDM 160c is added in the junction of RNC 135 and bearer 114c while STDM 160a is added in the junction of Nb 110c and bearer 114a and STDM 160b is added in the junction of Nb 110c and bearer 114b.

Each STDM 160a-c may be operable to receive downstream transportation, targeted toward its associated bearer 114a-c as well as process the received transportation in order to identify the type of payload that is being directed toward one of the MTs 120a-g. The transportation type data can be used to determine the appropriate service level to which the targeted MT 120a-g and/or the application are entitled. According to the type and the level of service, for example, an exemplary STDM 160a-c can control the load over the associated bearer 114 by aggregating, dropping or transferring the received transportation over the connection.

An alternate exemplary embodiment of the present invention (not shown in the drawings) may have one or more STDM 160 units wherein each unit is installed at the junction between an intermediate node, Nb, and a bearer for the purpose of controlling the upstream traffic—the traffic that is transferred from the MT 120 toward CSPP 130. In yet another variation, an embodiment of the present invention may employ an STDM 160 unit at each end of the bearer 114 such that both the downstream and the upstream traffic may be controlled.

Exemplary STDM 160a-c elements may communicate with each other as well as with the CSPP 130. The nature of the communication may include, for example, information regarding the current load over a certain path or even the type of communication that has been identified traveling over a certain path. Such information can be used to improve the efficiency of each STDM. Further, policy information and subscriber's related data can be communicated from CSPP 130 to each of the STDM 160a-c. The communication can be made over a status and control line (not shown in the drawing). In some embodiments of the present invention, the status and control connection may be out of band, for example over an IP network. In other embodiments of the present invention, the status and control line may be embedded within an associated bearer 114. More information on the operation and the construction of an exemplary STDM 160a-c is disclosed below relative to the descriptions of FIG. 2, FIGS. 3a-c and FIG. 4.

Figure 2:
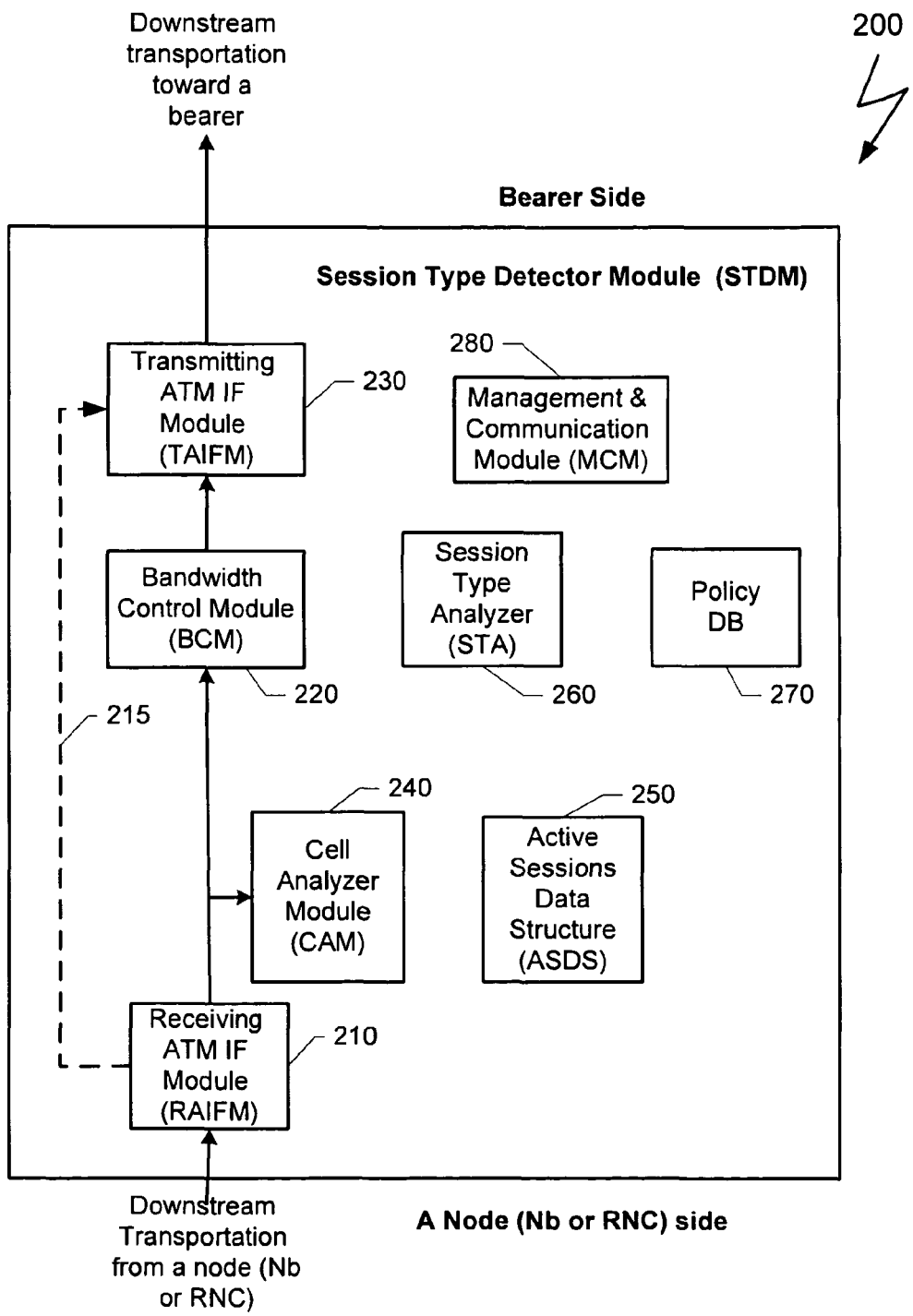
FIG. 2 is a block diagram illustrating relevant elements of an exemplary Session Type Detector Module (STDM) that operates according to certain exemplary techniques of the present disclosure.

FIG. 2 is a block diagram illustrating relevant elements of an exemplary embodiment of a session type detector module (STDM) 200 that operates according to certain techniques of the present disclosure. The exemplary STDM 200 that is illustrated in FIG. 2 can be installed in a junction between a node 110a-c,135 and an associated bearer 114a-c (see units 160a, 160b and 160c in FIG. 1).

In an exemplary embodiment, the STDM 200 may be operable to intercept the communication between the data link layer and the physical layer of the connection that is associated with a given node 110/135 and bearer 114a-c combination. Once the communication is intercepted, the STDM in the exemplary embodiment may process the received data and identify the type of throughput that is transferred over a connection during a certain session. The gathered information concerning the type of data may be used by the embodiment for managing the bandwidth consumption over the associated connection according to an eligible service level.

An exemplary STDM 200 may comprise numerous elements including, but not limited to, a receiving ATM interface module (RAIFM) 210, a bandwidth control module (BCM) 220, a transmitting ATM interface module (TAIFM) 230, an ATM cell analyzer module (CAM) 240, an active session data structure (ASDS) 250, a session type analyzer (STA) 260, a policy database (DB) 270 and a management and communication module (MCM) 280. Importantly, the particular embodiment of an STDM depicted in FIG. 2 is offered herein for exemplary purposes only. The presence, or absence, of any particular component, including components not shown in the exemplary embodiment, should not be construed as grounds for the limiting the scope or functionality of an STDM. Those skilled in the art will recognize that the specific combinations of elements that comprise embodiments of an STDM will inevitably vary according to the STDM application.

An exemplary MCM 280 element may be adapted to communicate with a CSPP 130. The nature of communication between an MCM 280 and a CSPP 130 may include, for example, information regarding the current load over a certain path, policy information and updates, or subscriber's related data. The communication can be accomplished over a status and control line (not shown in the drawing). As was described prior, in some embodiments of the present invention, the status and control connection may be out of band, for example over an IP network while in other embodiments the status and control line may be embedded within an associated bearer 114. Among other tasks, an MCM 280 may manage the operation of an STDM 200. For example, during initiation, an MCM 280 may allocate resources for each of the modules within an STDM 200, introduce the modules to each other and subsequently initiate them. Further, during the online operation, it may communicate with the CSPP 130 in order to acquire policy updates, reports on load conditions over the bearer, statistical information on session types, etc.

An exemplary RAIFM 210 operates as an interface between the ATM layer, the data link layer, and the physical layer. A RAIFM 210 may process the ATM cell header and determine the type of AAL. ATM cells that do not carry AAL-2 data may be transferred "as is" over the dotted connection 215 toward TAIFM 230. ATM cells that do carry AAL-2 traffic may be transferred toward BCM 220 with a copy of the cell placed in a queue of the CAM 240.

An exemplary TAIFM 230 may function inversely to that which has been described relative to the exemplary RAIFM 210. A TAIFM 230 may be operable to interface between the internal units of the STDM 200 and the physical network (the bearer). ATM cells that are received via connection 215, and carry AAL data other than AAL-2, are transferred "as is" toward a bearer that is connected to the output of the STDM 200. ATM cells that carry an AAL-2 chunk of data and received from the BCM 220 may be processed according to the physical layer protocol and transferred toward the bearer at the output of the STDM 200.

An exemplary BCM 220 is shown installed "in line" between the RAIFM 210 and TAIFM 230. The BCM 220 may be operable to receive incoming ATM cells from RAIFM 210 and control the bandwidth utilization over its associated bearer. Controlling decisions may be based, for example, on the communication session type, the current load over the bearer, or the policy of the service provider that is relevant to current conditions (the hour, the time, etc.). Controlling the bandwidth may be executed through actions such as, but not limited to, dropping a portion of the ATM cells or aggregating (postponing) other ATM cells for periods that have less traffic.

Applicable bandwidth control policies, or other relevant policies, promulgated by the service provider may be stored in DB 270 and readily accessed by the BCM 220. An exemplary relevant policy that may be retrieved from the DB 270 may be one that operates to define load controlling rules. In such an exemplary policy, the rules may depend on number of variables such as the specific hour or day (working days, weekends, holidays, etc.). Another variable taken into consideration may be the current load over the bearer in percentage of the maximum bandwidth of the bearer. The load may be below a predetermined level, within a percentage range (between 60% and 80%, for example), or above a predetermined level. Yet another variable may be the session type such as audio session over a circuit switched network, computer data communication over a packet switched network, real time session over a packet switched network, etc. Exemplary rules embodied in service provider policies and based on such variables may include postponing all computer data transportation over an IP connection during working hours when the load level is within a predetermined range for bandwidth of the bearer. Another exemplary rule may be dropping all IP computer data transportation when the load exceeds a predetermined. Yet another exemplary rule may operate to define conditions for dropping real-time audio or video sessions that are carried over an IP connection during weekends when the load is above a certain threshold.

Information about the current load over the associated bearer may be received from CSPP 130 via MCM 280. Additionally, information concerning the bandwidth consumption over the associated bearer may be calculated by the TAIFM 230 designated to monitor the traffic directed toward the bearer. The calculated load may be periodically transferred to MCM 280 and BCM 220. Further, the indication on the current load may be expressed, for example, as the portion of the current bandwidth consumption from the maximum bandwidth over the bearer.

Information about the session type may be retrieved from ASDS 250. The appropriate entry in the ASDS 250 may be retrieved according to the combination of Vp, Vc and CID while the field associated with the session type may be parsed by the BCM 220 in order to determine how to manage the traffic that is relevant to the current session. Again, any relevant policy may be retrieved from the policy DB 270 according to the current time, for example. In the event that the session type has not yet been determined, session traffic may be transferred "as is" toward the bearer via the TAIFM 230.

If session type is known, the relevant bandwidth control rule may be retrieved from policy DB 270 and subsequently implemented (the one that matches the current time, for example). In such an event, the appropriate variables (the current load, the session type, etc.) may be analyzed in light of the rule and a decision made as to handling of the data chunk such as transferring it "as is," aggregating it, or dropping it. An exemplary BCM 220 may include an aggregation module (not shown in the drawings) that comprises a bank of FIFOs (first in first out) memories. The FIFO memories may be of various sizes and use different clocks. Further, each FIFO memory may be associated with a different session type.

In an alternate exemplary embodiment of the present invention, two STDMs per bearer may be employed such that an STDM resides at each end of a bearer. In such an embodiment, an exemplary BCM may be adapted to alter the communication tunnel in which data chunks are transferred between the two STDMs. Altering the communication tunnel may be done dynamically based on load conditions over the bearer and the identified type of session. An alternative communication tunnel between two STDMs may be over another bearer (not shown) similar to bearer 114 (FIG. 1) or from another one using other communication protocols.

In parallel to the online path, RAIFM 210, BCM 220 and TAIFM 230, through which the data is transferred, an offline path may be used for determining the current communication session types that are carried over the bearer and use AAL-2 protocol. An exemplary offline path is comprised of CAM 240, ASDS 250 and STA 260. The exemplary CAM 240 may have a queue or buffer operable to store copies of AAL-2 ATM cells that have been transferred from RAIFM 210. Further, exemplary CAM 240 may be adapted to retrieve the next data chunk from the queue and parse the ATM AAL-2 header and the one or more CPS headers. Based on the combination of Vp, Vc and CID, CAM 240 may determine whether the session has an associated entry in ASDS 250.

An exemplary ASDS 250 may comprise a plurality of substructures with each substructure being associated with a Vp and Vc combination. Each substructure may include a "previous Vp/Vc indication" field. The indication field is useful to indicate two possible options, true or false, with true indicating that the previously processed AAL-2 data chunk belongs to said pair Vp/Vc and false indicating that it does not. Further, each substructure may be divided into a plurality of entries with each entry being associated with a CID. A combination of a certain substructure (Vp/Vc) and a certain entry in the substructure (CID) may be associated with traffic of an active session.

An entry in the substructure may be associated with a cyclic memory that stores relevant parameters of the last few received user's packets or frames of the associated session. The number of packets in the cyclic memory may be a configurable number such that a number of user's packets/frames may be in a predetermined range. An entry in a substructure may include fields such as, but not limited to, an indication for the Previous CID in the substructure that was analyzed by CAM 240, the receipt time of the beginning of a received user's IP packet or an audio or video frame that is carried over one or more AAL-2 data chunks, the receipt time of a current received AAL-2 data chunk, the accumulated size of the AAL-2 data chunks that are carrying the current packet or frame, or the address in the cyclic memory pointing to the storage location for information concerning the current packet.

An entry in ASDS may be reset when the CAM 240 determines that the user's packet or frame terminates with the information stored in the entry being copied to the next address in the associated cyclic memory. In some exemplary embodiments, the MCM 280 may have a task that is periodically initiated. The task, for example, may be to scan the ASDS 250 in search of entries that are not active. The decision to designate as active may be based on the time duration from the previous received AAL-2 data chunk, for example.

If an entry in the ASDS 250 for the given combination of Vp, Vc and CID does not exist, such may indicate a beginning of a new session and a newly received user's IP packet or an audio or video frame carried by the current AAL-2 data chunk. In such an event, an entry in the ASDS 250 may be allocated to the session in the substructure that is related to the relevant pair of Vp/Vc (assuming such exists, otherwise a substructure will be allocated as well) and the new entry associated with the relevant CID. Certain parameters that are relevant to the session may be stored in the entry of the ASDS at the appropriate fields. Exemplary parameters may be the time of receipt for the beginning of a user's IP packet or an audio or video frame, the receiving time of the current AAL-2 data chunk. The "previous (Vp/Vc) indication" may be transferred from the previous to the current substructure and "previous CID indication" in the substructure may be transferred from the previous entry to the current entry that is associated with the current CID. Further, a cyclic memory may be assigned to the entry such that the AAL-2 header may be parsed and the number of bytes in the data chunk counted until the end of the cell or, alternatively, a group of padding bytes or another AAL-2 header is reached. The number of bytes counted may be added to the field that was allocated to the accumulated number of bytes.

In the event that the ATM cell is reached, the CAM 240 may terminate the handling process for the current AAL-2 data chunk and release the processed data chunk from the queue of the CAM 240. The next data chunk from the queue would then be fetched and processed. If padding bytes or another CPS header is reached then such would indicate that the end of the relevant user's packet or frame has been found. Subsequently, the fields from the entry in the ASDS, such as but not limited to the field that represents the receipt time of the beginning current packet, its size (the accumulator field), etc., would be copied to the appropriate location in the cyclic buffer. After the relevant information is copied to the appropriate entry in the cyclic buffer, the entry in ASDS 250 that is associated with the relevant session would be reset and prepared for the next packet of the same session. For example, the fields that were copied to the cyclic buffer would be reset and the field that points the address in the cyclic buffer would be incremented and the processed data chunk released from the queue of CAM 240. Then, the next AAL-2 data chunk would be fetched from the queue.

When an associated entry in the ASDS 250 for the combination of Vp, Vc and CID is found, the field that is associated with the receipt time for the beginning of a user's packet or frame field may be checked to determine whether the received AAL-2 data chunk represents the beginning of a new user's packet or frame. If, in fact, the received AAL-2 data chunk does represent the beginning of a new user's packet or frame, then the AAL-2 header is parsed and the number of bytes in the data chunk counted until the end of the cell, or a group of padding bytes or another AAL-2 header, is reached. The counted number of bytes may be added to the field that was allocated to the accumulated number of bytes. If the end of the cell is reached, then the CAM 240 may terminate the handling of the current AAL-2 data chunk, release it from the queue, and fetch the next data chunk from the queue.

If padding bytes, or another header, are reached such that the end of the relevant user's packet or frame is reached is indicated, then the fields from the entry in the ASDS, such as but not limited to the field that represents the receipt time of the beginning current packet, its size (the accumulator field), etc., may be copied to the appropriate location in the cyclic buffer. After the relevant information has been copied to the appropriate entry in the cyclic buffer, the entry in the ASDS 250 associated with the relevant session may be prepared for the next packet of the same session. For example, the fields that were copied to the cyclic buffer are reset and the field that points to the address in the cyclic buffer is incremented while the data chunk is deleted from the queue and the next AAL-2 data chunk is fetched from the queue. More information on the operation of the CAM 240 is disclosed below in relative to the descriptions of FIGS. 3*a*, 3*b* and 3*c*.

The exemplary STA 260 may periodically scan all entries in the ASDS 250 checking the information stored in the entry and its associated cyclic memory. In doing so, the time interval per each entry (session) between the last received ATM cell and the current time is checked in order to determine whether the session is still active. If the time duration from the last received data is longer than a certain period (few hundreds of milliseconds to few tens of seconds, for example), then the session may be designated as inactive and the entry in the ASDS and its associated cyclic memory may be released.

If the session is deemed active, then the content of the associated cyclic memory is fetched. The relevant discriminating feature (user's packet or frame size, time between consecutive packets, etc) of each packet is fetched and statistical information may be calculated such as an average packet size of the session, average time between consecutive packets in the session, the standard deviation, etc. The calculated statistical information may be analyzed in order to define whether the results are valid. Validation may be determined by calculating the percentage of the standard deviation from the average. If the percentage is smaller than a configurable value, then it may be assumed that the calculated statistical information is valid and, therefore, may be used to determine the session type. If the results are not valid, the STA 260 may designate the session as unknown and may proceed to the next session in the ASDS 250.

If the statistical information indicates valid results, a decision process for determining the session type may be initiated. One embodiment of the present invention may use a decision matrix method for determining the session type. In such an embodiment, the statistical information may be placed in a decision matrix. An exemplary decision matrix may have two axes (rows and columns) wherein one axis may be associated with the average size of a packet in the session while the other axis may be associated with the average time interval between consecutive packets. The cross section areas between intervals in both axes may indicate the type of the session. Other exemplary embodiments of the STA 260 may use a decision matrix with a plurality of axes. For example, four axes may be used by other embodiments with the additional two axes being associated with the standard deviation of the size of packets and standard deviation of the time interval between packets.

An exemplary decision matrix may comprise a lookup table (LUT) in which the address bits of the LUT may be divided into groups with each group being associated with an axis (discriminating parameter). The data stored in each address may represent a session type. An exemplary LUT may be a random access memory, which may be loaded during initiation by the MCM 280. Alternatively, a LUT may be implemented by nonvolatile memory such as a Flash Memory that may be loaded and updated periodically by an administrator of the system.

After placing the necessary information in the decision matrix, the stored data in the matrix may be retrieved and parsed with the session type being deduced from the stored data in the LUT. Exemplary types may include a circuit switched audio session or circuit switched video session or packet switched computer data or packet switched audio session or video session or unknown. Regardless, the session type may be written in the appropriate field in the relevant entry of the ASDS 250.

Other exemplary embodiments of the present invention may observe each session feature independently of other features associated with the same session. For example, the packet size may be checked independently from the repetition rate. Subsequently, the results of the different observations may be compared. If a calculation based on the compared results is above a configurable value, then such may indicate the session type. More information on the functionality of an exemplary STA 260 is disclosed below relative to the description associated with FIG. 4.

Figure 3A:
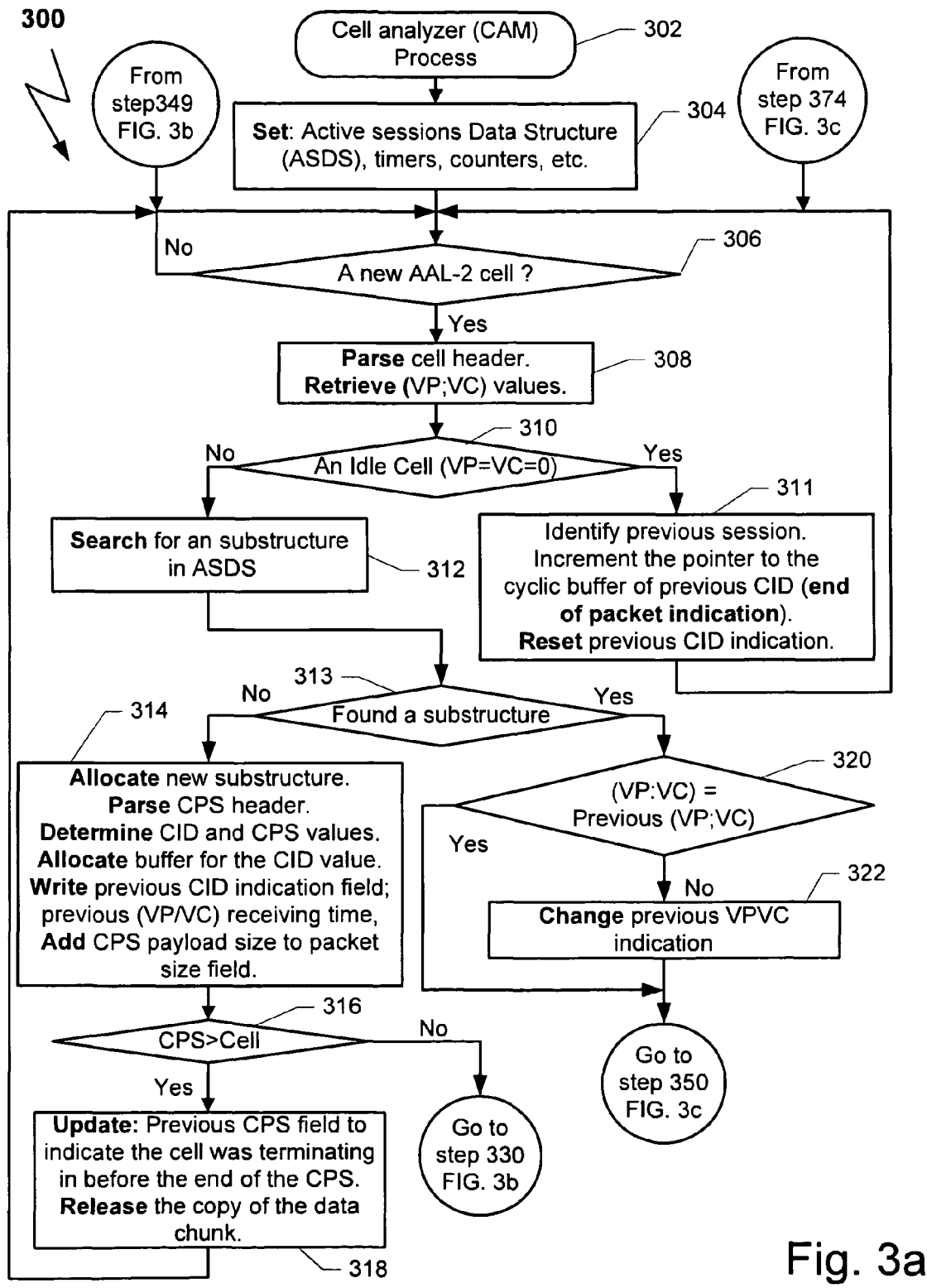
FIGS. 3a, 3b and 3c are flowcharts depicting relevant processes of an exemplary embodiment of a method for cell analyzing.
Figure 3B:
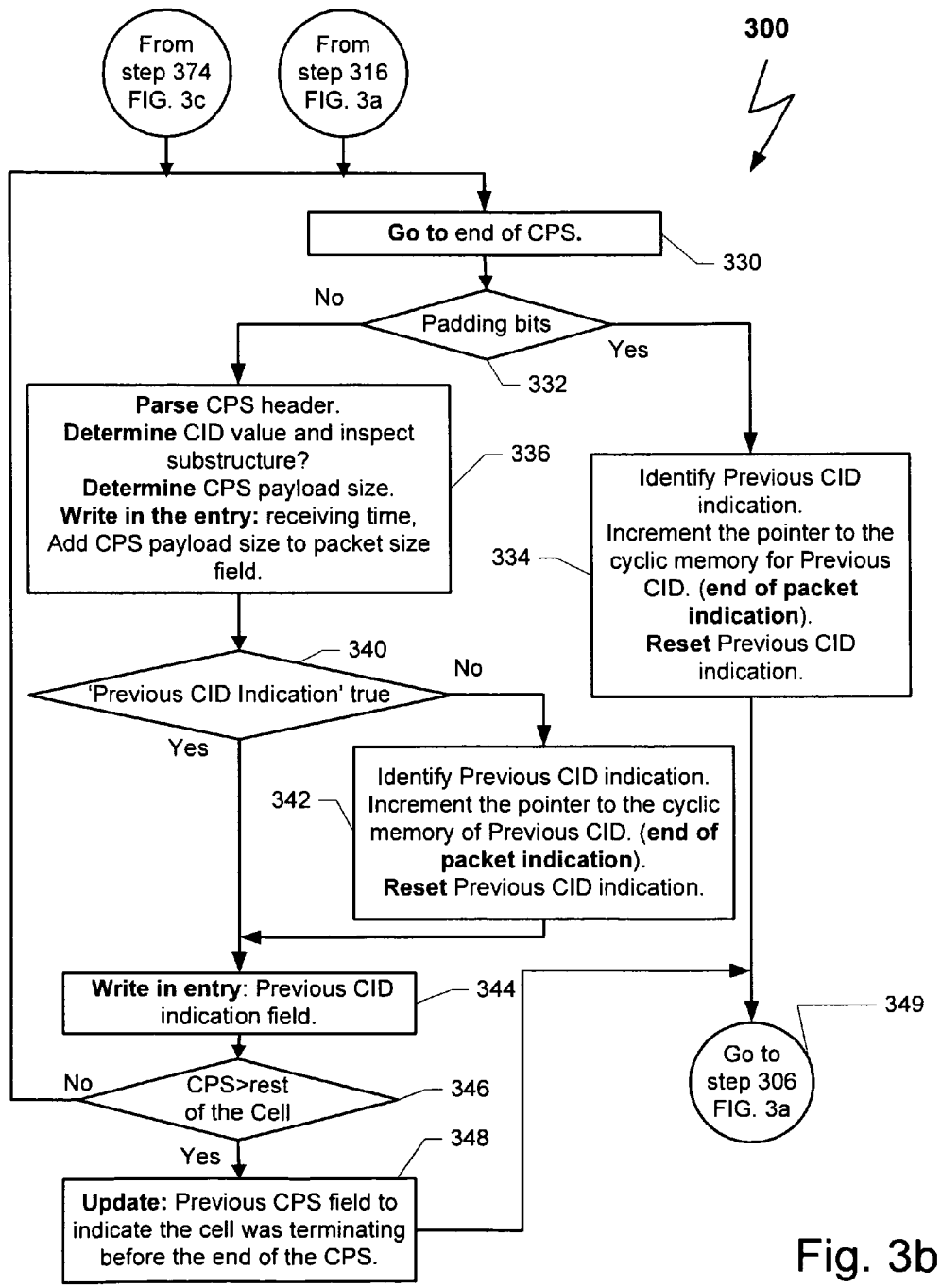
Figure 3C:
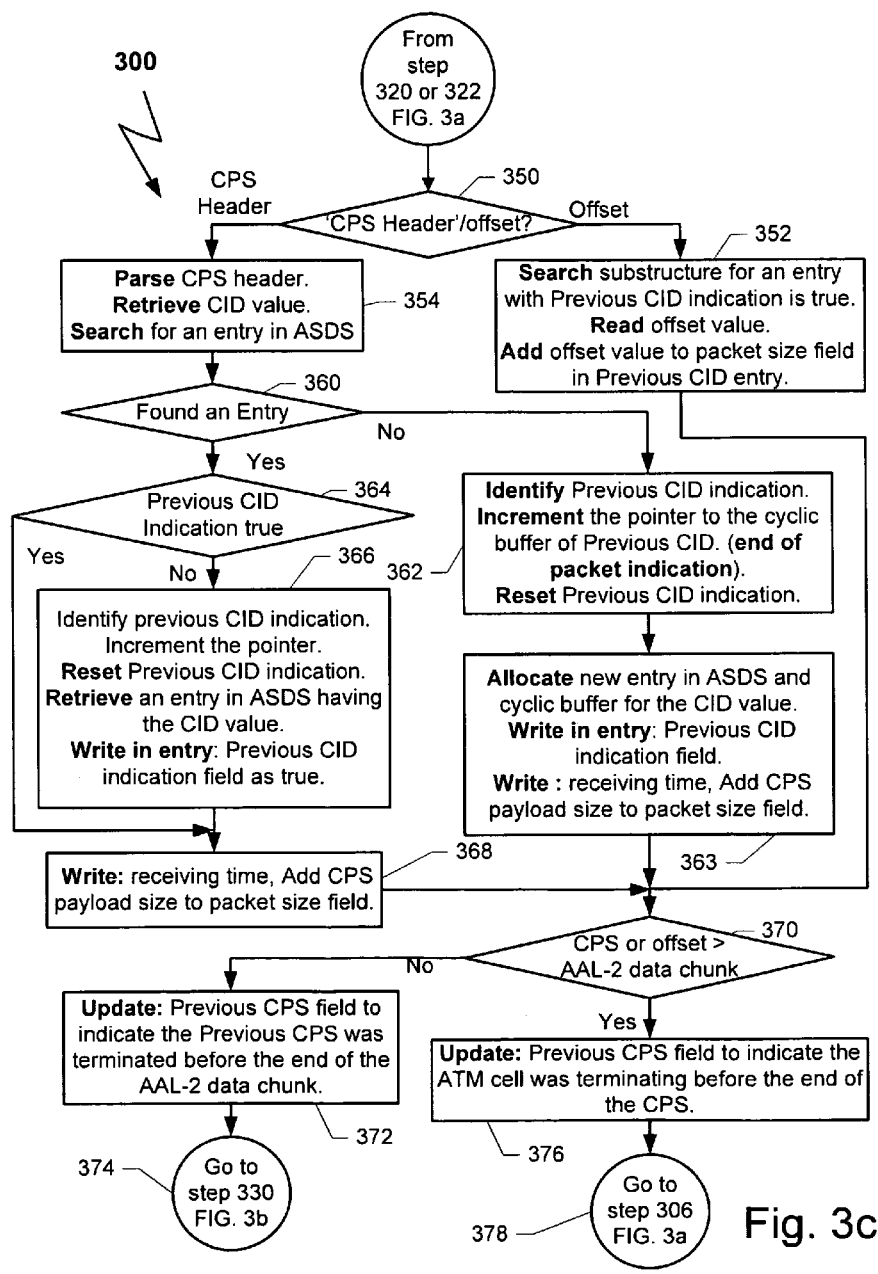

FIGS. 3a, 3b, and 3c are flow diagrams illustrating relevant processes (steps) of an exemplary method 300. Method 300 may be executed by an exemplary CAM 240 (FIG. 2) for analyzing ATM cells that carry AAL-2 data chunks in order to determine certain parameters of a user's packet-switched packet or a circuit-switched audio/video encoded frame. Exemplary parameters may be the receipt time of the beginning of a packet or frame, the size of a packet or frame (the total number of bytes that were embedded within an IP packet or an audio/video frame), etc.

An Exemplary method 300 may be initiated 302 by MCM 280 (FIG. 2) upon "power on" status, for example. During initiation 302, the CAM 240 may be introduced 302 to its input queue and to the queues of its associated logical modules in the STDM 200 (FIG. 2). After initiation 304, resources which are relevant to the operation of the CAM 240, such as the ASDS 250, counters, clock, timer, etc., may be allocated and reset. After the preparation process 304, task 300 may run in a loop as long as the STDM 200 is active. Each loop may start by checking 306 the input queue of the CAM 240 and looking for the next AAL-2 ATM cell data chunk. If there is no data chunk in the queue, then method 300 may wait until receiving the next chunk from the RAIFM 210 (FIG. 2).

If 306 a new data chunk exists in the queue of CAM 240, the data chunk is fetched 308, the header is parsed and the combination of Vp/Vc is retrieved and the values of Vp/Vc are checked 310. If the values are equal to zero (an idle cell), such may mean that the previous ATM cell of the previous session has ended carrying the end of a user's packet or frame of the previous session. Therefore, the ASDS 250 is searched 311 for the previous session substructure (Vp/Vc) looking for the "previous Vp/Vc indication". In the found previous substructure, an entry with the "previous CID indication" true is searched. This entry is retrieved and parsed and the fields with the receipt time of the beginning of the packet and the size of the packet are transferred to the associated cyclic memory at the address that is written in the field of "next address in the associated cyclic memory.". Next, the value in the "next address in the associated cyclic memory" field is incremented and the fields in the entry of the ASDS 250 that were copied to the cyclic memory (receipt time of the packet and the size) are reset in order to be ready for the next packet of the same session. In addition, the field of "previous CID" may also be reset. The copy of the AAL-2 data chunk is released from the queue of the CAM 240 (FIG. 2) and method 300 dictates a return to step 306 for processing the next AAL-2 data chunk.

If 310 at least one of the values of the pair Vp/Vc is not zero, then the ASDS is searched 312 for a substructure that has the same VP/VC as the retrieved VP/VC of the new AAL-2 data chunk. If 313 no substructure is found, such may mean that a first AAL-2 data chunk of a new pair Vp/Vc has been identified. In such an event, a new substructure is allocated 314 in the ASDS 250 for the new pair and the "previous (Vp/Vc) indication" is transferred from the previously marked substructure to the new one. The CPS header is parsed for determining the CID and the new entry is allocated in the ASDS 250 for the relevant session CID and the "previous CID indication" field is set as true. The receipt time of the data chunk is written in the field that is associated with the receipt time of the beginning of the user's packet/frame and cyclic memory is allocated and assigned to the new entry (Vp, Vc and CID).

The CPS header is further processed in order to determine the length of the portion of the CPS payload which carries the current AAL-2 data chunk. The number of bytes dedicated to the CPS in the current AAL-2 data chunk is then written in the accumulator of the user's packet/frame field in the relevant entry of the ASDS 250. Next, a comparison is made 316 between the size (portion) of the CPS's payload retrieved from the header and the rest of the AAL-2 data chunk. If the CPS payload portion is shorter than the AAL-2 data chunk without header 316, such may mean that the CPS session terminates before the end of the AAL-2 data chunk. In such case, method 300 dictates proceeding to step number 330 in FIG. 3B.

If 316 the CPS payload is longer than the rest of the AAL-2 data chunk, a field in the entry that is associated with the CPS may be set 318 to indicate that the previous ATM cell was terminated before the end of the CPS's payload. The copy of the AAL-2 data chunk may be released from the queue of the CAM 240 (FIG. 2) and method 300 returns to step 306 to process the next AAL-2 data chunk.

Returning now to step 313, if a substructure with the same VP/VC as the new AAL-2 data chunk was found in the ASDS 250 (FIG. 2) then the "previous (Vp/Vc) indication" field in this substructure may be inspected. If 320 it is true, meaning that the previous received AAL-2 data chunk had the same Vp/Vc values, then method 300 proceeds to step number 350 in FIG. 3c. If 320 is not true, then 322 the ASDS 250 is searched 322 for the "previous (Vp/Vc) indication" and the indication is transferred from the previous substructure (VP/VC) to the current one and then method 300 proceeds to step 350 in FIG. 3c.

Referring now to FIG. 3b, a portion of an exemplary method 300 that handles ATM cells carrying data chunks of two or more CPSs is illustrated. After determining that the current analyzed CPS is shorter than the length of the AAL-2 data chunk (steps 316 FIG. 3a or step 374 FIG. 3c), method 300 proceeds to step 330 and searches for the end of the current CPS by checking 332 whether at the end of the CPS there are padding bytes and, if so, counting them until the end of the AAL-2 data chunk.

If 332 the CPS terminates with padding bytes, such may indicate that the end of a user's IP packet or an encoded audio/video frame has been reached. In this event, the ASDS 250 (FIG. 2) may be searched 334 for the previous session. In searching the previous session, the previous substructure (Vp/Vc) that is marked with "previous Vp/Vc indication" is analyzed. In this substructure, the "previous CID indication" is searched. The CID that its previous indication is true is the previous session. This entry is retrieved and parsed while the fields with the receipt time of the beginning of the packet and the size of the packet are transferred to the associated cyclic memory at the address that is written in the field of 'next address in the associated cyclic memory'. Next, the value of the 'next address in the associated cyclic memory' is incremented. The fields in the entry of the ASDS 250 that were copied to the cyclic memory (receipt time of the packet and the size) are reset to be ready for the next packet of the same session. In addition, the field of "previous CID" is reset as well. The copy of the AAL-2 data chunk is released from the queue of the CAM 240 (FIG. 2) and method 300 returns 349 to step 306 (FIG. 3a) for processing the next AAL-2 data chunk.

If 332 the current CPS doesn't terminate with padding bytes and instead terminates with a header of another CPS, then the header of the other CPS is parsed 336 to determine the CID. The relevant substructure is searched for an entry in the ASDS 250 that is associated with the parsed CID. If an entry is not found (indicating a beginning of a new session), then a new entry is allocated to the relevant session CID and a cyclic memory is allocated and assigned to the new entry (Vp, Vc and CID). The receipt time of the data chunk is written in the entry's field that is associated with the receipt time of the beginning of the user's packet/frame. If an entry is found in the relevant substructure Vp, Vc & CID, then the entry is fetched. The CPS header is further processed for determining the length of the portion of the CPS payload which is carried by the current AAL-2 data chunk. The number of bytes that belongs to the CPS in the current AAL-2 data chunk is written in the accumulator of the user's packet/frame field in the relevant entry of the ASDS 250 while the receipt time of the current data chunk is written in the appropriate field. Next, a decision is made 340 as to whether the "previous CID indication" field in the entry is true.

If 340 "previous CID indication" field is true, method 300 proceeds to step 344. If 340 not, method 300 dictates that the end of the previous CPS was an end of a user's IP packet or an encoded audio/video frame. Therefore, the relevant substructure in the ASDS 250 (FIG. 2) is searched 342 for an entry (session) with same VP/VC that its "previous CID indication" is true. The CID that its previous indication is true is indicative of the previous session. This entry is retrieved and parsed while the fields with the receipt time of the beginning of the packet and the size of the packet are transferred to the associated cyclic memory at an address that is written in the field of 'next address in the associated cyclic memory'. Next, the value of the 'next address in the associated cyclic memory' is incremented. The fields in the entry of the ASDS 250 that were copied to the cyclic memory (receipt time of the packet and the size) are reset to be ready for the next packet of the same session. Additionally, the field of "previous CID" is reset as well.

At step 344, the "previous CID indication" field of the current entry is set to true. Then, a comparison is made 346 between the size of the CPS's payload retrieved from the header and the rest of the AAL-2 data chunk. If the CPS payload is shorter than the rest of the AAL-2 346, method 300 returns to step 330 for processing the next CPS in the AAL-2 data chunk. If 346 the current CPS is longer than the rest of AAL-2 data chunk, then a field in the entry that is associated with the CPS is set 348 to indicate that the previous ATM cell was terminated before the end of the previous CPS. The copy of the AAL-2 data chunk is subsequently released from the queue of the CAM 240 (FIG. 2) and method 300 returns 349 to step 306 for processing the next AAL-2 data chunk in the queue.

FIG. 3c illustrates a portion of an exemplary method 300 that manages an AAL-2 data chunk having a substructure (Vp/Vc) in the ASDS 250 (FIG. 2). The cell is further processed in order to determine whether 350 there is an offset to the beginning of the next CPS header. Determining the existence of the offset is done by parsing the offset field. If 350 there is an offset, the relevant substructure is searched 352 for the previous session, an entry that its "previous CID" indication' field is true. The value of the offset is added to the packet size field in the previous session entry.

A comparison is made 370 between the size of the offset (retrieved from the header) and the size of the rest of the AAL-2 data chunk. If 370 the offset size is shorter than the rest of the AAL-2 data chunk, then a field in the entry in ASDS 250 that is associated with the CPS is set 372 to indicate that the previous CPS has terminated before the end of the current AAL-2 data chunk and method 300 moves 374 to step 330 in FIG. 3b in order to process the next CPS in the current AAL-2 data chunk. If 370 the offset is longer than the rest of the AAL-2 data chunk, then the field in the entry that is associated with the CPS is set 376 to indicate that the previous ATM cell has terminated before the end of the CPS. The copy of the AAL-2 data chunk is released from the queue of the CAM 240 (FIG. 2) and method 300 returns 378 to step 306 in order to process the next AAL-2 data chunk in the queue.

Returning now to step 350, if a CPS header follows the AAL-2 header then the new CPS header is parsed 354 and the value of its CID is retrieved and the relevant substructure in ASDS 250 is searched for an entry that is associated with the CID. If 360 an entry was not found, such would indicate that the current (new) CPS belongs to a new session having a new CID value. The new session indicates that the user's packet or 'audio/video encoded frame' that was carried by the previous session of the same substructure (Vp/Vc) has ended.

Therefore, the previous session's substructure in the ASDS 250 is searched 362 for the entry with the "previous CID indication" being true. This entry is retrieved and parsed while the fields with the receipt time of the beginning of the packet and the size of the packet are transferred to the associated cyclic memory at an address that is written in the field of 'next address in the associated cyclic memory'. Next, the value of the 'next address in the associated cyclic memory' is incremented. The fields in the entry of the ASDS 250 that were copied to the cyclic memory (receipt time of the packet and the size) are reset to be ready for the next packet of the same session. In addition the field of "previous CID indication" field is reset.

After treating the previous session, the handling of the current new session is initiated 363. A new entry in the substructure (Vp/Vc) is allocated to the new session (CID) and the "previous CID indication" field is set as true (in preparation for processing of the next received data chunk). The receipt time of the data chunk is written in the field that is associated with the receipt time of the beginning of the user's packet/frame and the size of the CPS data chunk is added to the packet size field in the entry. A cyclic memory is allocated and assigned to the new entry (CID) in the substructure (Vp/Vc). Next, a comparison is made 370 between the CPS size (or the offset) and the size of the rest of the AAL-2 data chunk and method 300 proceeds as it is disclosed above.

If 360 an entry is found in the relevant substructure (Vp, Vc & CID), then the "previous CID indication" entry field is inspected 364. If the "previous CID indication" field is marked true, then 368 the receipt time of the current data chunk is written in the appropriate field and the size (number of bytes) that is associated with the CPS and included in the AAL-2 data chunk is added to the user's packet/frame' field in the entry. At such point, method 300 continues via step 370 as it is disclosed above.

If 364 the "previous CID indication" is marked false, then the relevant substructure is searched 366 for the entry with its "previous CID indication" is marked true. This entry is retrieved and parsed and the fields with the receipt time of the beginning of the packet and the size of the packet are transferred to the associated cyclic memory at an address that is written in the field of 'next address in the associated cyclic memory.' Then the value of the 'next address in the associated cyclic memory' is incremented. The fields in the entry of the ASDS 250 that were copied to the cyclic memory (receipt time of the packet and the size) are reset to be ready for the next packet of the same session. In addition, the field of "previous CID" is reset.

After treating the previous session, the handling of the current session continues. The entry that was assigned to the current session (CID) is retrieved. The "previous CID indication" field in the entry is set as true. The receipt time of the data chunk is written in the field that is associated with the receipt time of the beginning of the user's packet/frame. The size of the CPS data chunk is added 368 to the packet size field in the entry then the receipt time of the current data chunk may be written in the appropriate field labeled "previous CID." Next, a comparison is made 370 between the CPS size and the rest of the AAL-2 data chunk and method 300 proceeds from step 370 as disclosed above.

Figure 4:
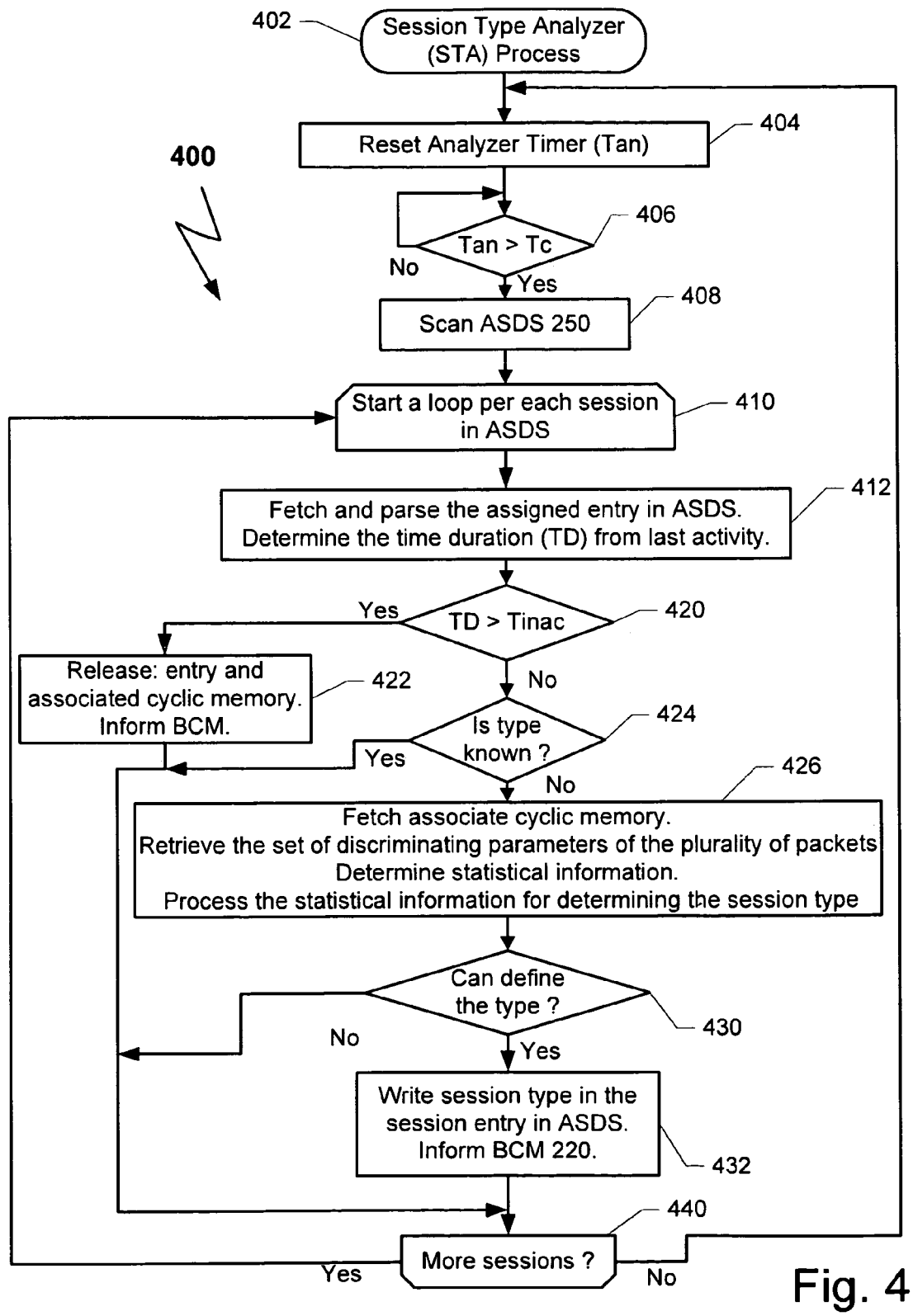
FIG. 4 is a flowchart depicting relevant processes of an exemplary embodiment of a method for session analyzing.

FIG. 4 illustrates a flowchart showing relevant processes (steps) of an exemplary method 400 for session analyzing. Task 400 may be executed by an exemplary STA 260 (FIG. 2) for analyzing the session types that are currently carried by AAL-2 data chunks between RAIFM 210 and BCM 220 (FIG. 2). Method 400 may process certain discriminating features of a user's packet-switched packet or a circuit-switched audio/video encoded frame. Exemplary discriminating features may be the time duration between consecutive packets/frames, the bandwidth consumption of the session, the size of a packet/frame (the total number of bytes that were embedded within an IP packet or an audio/video frame), etc. Those features may be extracted by the CAM 240 (FIG. 2) using method 300 (FIG. 3a-c), for example. The features may be stored in the session entry (CID) in the appropriate substructure (Vp/Vc) of ASDS 250 (FIG. 2) and its assigned cyclic memory.

Exemplary task 400 may be initiated 402 by the MCM 280 (FIG. 2) upon "power on" status, for example. During initiation 402, the STA 260 may be introduced to its input queue and to the queues of its associated logical modules in the STDM 200 (FIG. 2). After initiation, resources such as counters, clock, timer, memory, etc., which are relevant to the operation of the STA 260, may be allocated 402 and set. After the preparation process, task 400 may run in a loop as long as the STDM 200 is active. Each loop starts by resetting 404 an analyzer loop timer (Tan) and waiting 406 until the value of the analyzer timer Tan is greater than Tc. Tc may be a configurable parameter. Exemplary values of Tc may be in the range of few milliseconds to few hundreds of milliseconds.

When 406 Tan reaches the value of Tc, then the ASDS 250 may be scanned 408. A loop, between step 410 and 440, is initiated per each entry (session, CID) in each substructure (Vp/Vc) of the ASDS 250. The associated entry is fetched 412 and parsed. The time duration (TD) from the previous activity (previous received data chunk of the session) is calculated. The time of the previous activity may be found in the receipt time field in the entry that was assigned to the session in the ASDS. Then, a decision is made 420 whether the time duration is longer than a configurable parameter, Tinac (inactive period). The value of Tinac may be in the range of few seconds to few tens of seconds, for example.

If 420 TD is bigger than Tinac, the session may be considered as an inactive session, therefore 422 the relevant entry in the ASDS 250, along with its associated cyclic memory, may be released. BCM 220 may be informed that the session (Vp, Vc and CID) was terminated and its type may be deleted. At step 440, a decision is made as to whether there is an additional entry (session) in the current substructure and, if not, the next substructure is checked. If 440 there are no more entries, method 400 returns to step 404 and starts the next analyzing loop. If 440 an entry exists, then method 400 returns to step 410 and initiates the loop for the next entry.

If 420 the session is active, TD is smaller than Tinac, then the field that is used for storing the session type is retrieved from the entry. Then in step 424, the STA 260 determines whether the session type is already known. If 424 the type is known, method 400 continues to step 440 and proceeds per the steps described above. If 424 the type is unknown, data stored in the associated cyclic memory is analyzed 426 in order to determine the session type.

At step 426 the associated cyclic memory is retrieved. Each address in the cyclic buffer stores information that is related to a packet/frame. The information may be the receipt time of the beginning of the packet/frame or the size of the packet/frame. Exemplary method 400 may calculate one or more statistical variables such as the average and the standard deviation of the discriminating features of the stored packets. Exemplary statistical variables may be the average packet/frame size, the average time between consecutive packets/frames (the repetition rate), the bandwidth consumption by the session, or other relevant variables.

Exemplary embodiments of the present invention may implement a different decision algorithm in order to process the calculated statistical information. An exemplary embodiment may use a plurality of decision matrixes. Each decision matrix may be associated with a single statistical variable. Each matrix may be implemented as a lookup table (LUT). An exemplary decision matrix may use the packet/frame average size as one axis and the other axis may be representative of the session type. Such a matrix may be such as table 1, for example:

TABLE 1 session type versus user's packet/frame size.

| Average size in bytes | X > 500 | X < 220 | 20 < X < 80 |
|---|---|---|---|
| Session Type | IP computer data | VoIP | encoded Audio/video frame over circuit switch |

Another exemplary matrix may use the average time between consecutive packet/frame as one axis and the other axis may represent the session type. Such a matrix may be such as that depicted in table 2, for example:

TABLE 2 session type versus time between consecutive user's packet/frame.

| Average time in milliseconds | <10 | 20-60 | 10 < X < 20 |
|---|---|---|---|
| Session Type | IP computer data | VoIP | encoded Audio over circuit switch |

Other exemplary embodiments of method 400 may use a decision matrix with a plurality of dimensions. For example, an alternative embodiment may use four axes for defining the session type. The axes may be user's packet/frame size, time between consecutive packets, user's bandwidth consumption, time behavior (constant rate, burst mode, randomly changes between high/low throughput, etc). An exemplary method may validate 430 its decision in order to determine whether a session type may be defined. Different validation processes may be used. An exemplary process may compare the results from two or more decision matrixes. If at least two decision matrixes point to a certain type, for example, then it may be defined as the session type 430. If 430 the type cannot be defined, method 400 proceeds to step 440. If 430 the session type can be defined, then the session type is written 432 in the appropriate field in the entry in the ASDS and the BCM 220 (FIG. 2) may be informed about the type of the session. Based on the session type, the BCM 220 may determine how to handle the next incoming data chunks of the session. After informing the BCM 220, method 400 proceeds to step 440.

In the description and claims of the present application, each of the verbs, "comprise", "include" and "have", and conjugates thereof, are used to indicate that the object or objects of the verb are not necessarily a complete listing of members, components, elements, or parts of the subject or subjects of the verb.

In this application the words "unit" and "module" are used interchangeably. Anything designated as a unit or module may be a stand-alone unit or a specialized module. A unit or a module may be modular or have modular aspects allowing it to be easily removed and replaced with another similar unit or module. Each unit or module may be any one of, or any combination of, software, hardware, and/or firmware. Software of a logical module can be embodied on a computer readable medium such as a read/write hard disc, CDROM, Flash memory, ROM, etc. In order to execute a certain task a software program can be loaded to an appropriate processor as needed.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Many other ramifications and variations are possible within the teaching of the embodiments comprising different combinations of features noted in the described embodiments.

It will be appreciated by persons skilled in the art that the present invention is not limited by what has been particularly shown and described herein above. Rather the scope of the invention is defined by the claims that follow.

What is claimed is:

1. A method for identifying features of communication sessions over a bearer between two nodes, wherein the communication content is carried over at least three layers including a user layer, an adaptation layer and a data link layer and wherein the data in each layer is organized in layer's frames and wherein each layer's frame is comprised of a header and payload, the method comprising the steps of:
    intercepting the communication between the two nodes; and
    processing a chain of a plurality of data link layer frames that carry the communication, wherein each data link layer frame is associated with one or more sessions and wherein
    each data link layer frame is processed by:
        parsing the header of the data link layer frame;
        parsing the header of the adaptation layer frame;
        identifying the one or more sessions carried by the received data link layer frame; and
    each session is processed by:
        determining which portion of a user's frame belonging to the session is included in the data link layer frame wherein:
            if the beginning of the user's frame is included, then storing a receipt time and a number of bytes of the session that are included in the data link layer frame in a storage volume that was allocated to the session in an entry that was allocated to a next user's frame;
            if the end of the user's frame is included, then adding the number of bytes of the session that are included in the data link layer frame to the number of bytes that are stored in the entry that was allocated to the user's frame and notifying the end of the user's frame;
            if a portion of the user's frame is included, then adding the number of bytes of the session that are included in the data link layer frame to the number of bytes that are stored in the entry that was allocated to the user's frame;

if the entire user's frame is included, then storing the receipt time and the number of bytes of the session that are included in the data link layer frame in a storage volume that was allocated to the session in an entry that was allocated to a next user's frame and notifying the end of the user's frame.

2. The method of claim 1, wherein at least one user's frame is selected from a group consisting of an Internet Protocol (IP) packet carried over a packet switched network, an encoded audio frame carried over a circuit switched network, and an encoded video frame carried over a circuit switched network.

3. The method of claim 1, wherein the user's frames are encrypted.

4. The method of claim 1, wherein at least one of the features of the data communication session is selected from a group consisting of size of user's frames, time between consecutive user's frames, bandwidth consumption by the session and time dependent behavior of the session.

5. The method of claim 1, wherein notifying the end of packet comprises allocating an entry for a next user's frame of the same session in the storage volume that was allocated to the session.

6. The method of claim 1, wherein the data link layer is an ATM.

7. The method of claim 6, wherein a session is defined by a combination of Vp, Vc and CID.

8. The method of claim 1, further comprising:
determining at least one feature of a data communication session from the information stored in a storage volume that was allocated to the session and determining the session type.

9. The method of claim 8, further comprising controlling the load over the bearer based on the determined session type.

10. The method of claim 9, wherein controlling the load over the bearer is executed by dynamically changing the communication tunnel of one or more data link frames of at least one session according to its type.

* * * * *